US010846483B2

(12) United States Patent
Cao et al.

(10) Patent No.: US 10,846,483 B2
(45) Date of Patent: *Nov. 24, 2020

(54) METHOD, DEVICE, AND APPARATUS FOR WORD VECTOR PROCESSING BASED ON CLUSTERS

(71) Applicant: ADVANCED NEW TECHNOLOGIES CO., LTD., Grand Cayman (KY)

(72) Inventors: Shaosheng Cao, Hangzhou (CN); Xinxing Yang, Hangzhou (CN); Jun Zhou, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,456

(22) Filed: Jan. 29, 2020

(65) Prior Publication Data
US 2020/0167527 A1 May 28, 2020

Related U.S. Application Data

(63) Continuation of application No. PCT/CN2018/105959, filed on Sep. 17, 2018.

(30) Foreign Application Priority Data

Nov. 14, 2017 (CN) .......................... 2017 1 1123278

(51) Int. Cl.
G06F 40/30 (2020.01)
G06F 16/27 (2019.01)
(Continued)

(52) U.S. Cl.
CPC ............ *G06F 40/30* (2020.01); *G06F 16/273* (2019.01); *G06F 16/3347* (2019.01); *G06F 16/353* (2019.01)

(58) Field of Classification Search
CPC ...... G06F 40/30; G06F 16/273; G06F 16/353; G06F 16/3347
See application file for complete search history.

(56) References Cited

U.S. PATENT DOCUMENTS

| 5,233,681 A | 8/1993 | Bahl et al. |
| 5,317,507 A | 5/1994 | Gallant |
| (Continued) | | |

FOREIGN PATENT DOCUMENTS

| CN | 105095444 A | 11/2015 |
| CN | 105786782 A | 7/2016 |
| (Continued) | | |

OTHER PUBLICATIONS

Lian et al., "Asynchronous Parallel Stochastic Gradient for Nonconvex Optimization," Advances in Neural Information Processing Systems 28 (NIPS 2015), 2015, pp. 1-9 (Year: 2015).*

(Continued)

*Primary Examiner* — Michelle M Koeth

(57) ABSTRACT

A cluster includes a server cluster and a worker computer cluster. Each worker computer included in the worker computer cluster separately obtains a word and at least one context word of the word that are extracted from a corpus. The worker computer obtains word vectors for the word and the at least one context word. The worker computer calculates a gradient according to the word, the at least one context word, and the word vectors. The worker computer asynchronously updates the gradient to a server included in (Continued)

the server cluster. The server updates the word vectors for the word and the at least one context word of the word according to the gradient.

15 Claims, 4 Drawing Sheets

(51) Int. Cl.
*G06F 16/33* (2019.01)
*G06F 16/35* (2019.01)

(56) References Cited

U.S. PATENT DOCUMENTS

| | | | |
|---|---|---|---|
| 5,325,298 | A | 6/1994 | Gallant |
| 5,619,709 | A | 4/1997 | Caid et al. |
| 5,828,999 | A | 10/1998 | Bellegarda et al. |
| 6,137,911 | A | 10/2000 | Zhilyaev |
| 6,317,707 | B1 | 11/2001 | Bangalore et al. |
| 7,007,069 | B2 | 2/2006 | Newman et al. |
| 7,251,637 | B1 | 7/2007 | Caid et al. |
| 7,280,957 | B2 | 10/2007 | Newman et al. |
| 7,340,674 | B2 | 3/2008 | Newman |
| 7,877,258 | B1 | 1/2011 | Chelba et al. |
| 8,027,938 | B1 | 9/2011 | Xu et al. |
| 8,032,448 | B2 | 10/2011 | Anderson et al. |
| 8,204,737 | B2 | 6/2012 | Suominen |
| 8,488,916 | B2 | 7/2013 | Terman |
| 8,612,203 | B2 | 12/2013 | Foster et al. |
| 8,719,257 | B2 | 5/2014 | Rangan |
| 9,600,568 | B2 | 3/2017 | Rangan |
| 9,830,378 | B2 | 11/2017 | Stockton et al. |
| 10,083,176 | B1 | 9/2018 | Desai et al. |
| 2003/0074368 | A1 | 4/2003 | Schuetze et al. |
| 2003/0130998 | A1 | 7/2003 | Fox et al. |
| 2005/0165556 | A1 | 7/2005 | Barnhill et al. |
| 2008/0109454 | A1 | 5/2008 | Willse et al. |
| 2014/0229158 | A1 | 8/2014 | Zweig et al. |
| 2015/0220833 | A1 | 8/2015 | Le |
| 2016/0019471 | A1 | 1/2016 | Shin et al. |
| 2016/0070748 | A1 | 3/2016 | Firat et al. |
| 2016/0350288 | A1 | 12/2016 | Wick et al. |
| 2017/0139899 | A1 | 5/2017 | Zhao |
| 2017/0300828 | A1* | 10/2017 | Feng ............... G06N 20/00 |
| 2017/0372694 | A1 | 12/2017 | Ushio |
| 2018/0075324 | A1* | 3/2018 | Kaji ............... G06K 9/6269 |
| 2018/0182376 | A1 | 6/2018 | Van Gysel et al. |
| 2018/0336183 | A1 | 11/2018 | Lee et al. |
| 2018/0336241 | A1 | 11/2018 | Noh et al. |
| 2019/0019055 | A1 | 1/2019 | Zhou et al. |
| 2019/0050743 | A1 | 2/2019 | Chen et al. |
| 2019/0370394 | A1 | 12/2019 | Li et al. |

FOREIGN PATENT DOCUMENTS

| | | |
|---|---|---|
| CN | 106802888 A | 6/2017 |
| CN | 106897265 A | 6/2017 |
| CN | 107102981 A | 8/2017 |
| CN | 107239443 A | 10/2017 |
| CN | 107247704 A | 10/2017 |
| CN | 107273355 A | 10/2017 |
| CN | 107957989 A | 4/2018 |
| CN | 108170663 A | 6/2018 |
| TW | 201732651 A | 9/2017 |

OTHER PUBLICATIONS

Goldberg et al., "word2vec Explained: deriving Mikolov et al.'s negative-sampling word-embedding method," 2014 (accessible at "https://arxiv.org/abs/1402.3722," last accessed Apr. 10, 2020) (Year: 2014).*
First Search Report for Chinese Application No. 201710992297.8, dated Jan. 15, 2020, 1 page.
First Search Report for Taiwanese Application No. 107129401, dated Jul. 8, 2019, 1 page.
International Search Report and Written Opinion of the International Searching Authority for International Application No. PCT/CN2018/101053, dated Nov. 20, 2018, with partial machine English translation, 9 pages.
First Search Report for Chinese Application No. 201711123278.8, dated Jan. 22, 2020, 2 pages.
First Office Action for Chinese Application No. 201711123278.8, dated Feb. 6, 2020, 15 pages.
First Search Report for Taiwanese Application No. 107131853, dated Jun. 21, 2019, 1 page.
International Search Report and Written Opinion of the International Searching Authority for International Application No. PCT/CN2018/105959, dated Dec. 20, 2018, with partial machine English translation, 10 pages.
Non-Final Office Action for U.S. Appl. No. 16/743,224 dated Mar. 30, 2020.
Collobert, Ronan, and Jason Weston. "A unified architecture for natural language processing: Deep neural networks with multitask learning." Proceedings of the 25th international conference on Machine learning (Year: 2008).
Mikolov, Tomas, et al. "Efficient estimation of word representations in vector space." arXiv preprint arXiv: 1301.3781 (Year: 2013).
Lai, Siwei, et al. "Recurrent convolutional neural networks for text classification." Twenty-ninth AAAI conference on artificial intelligence (Year: 2015).
Yu, Jinxing, et al. "Joint embeddings of chinese words, characters, and fine-grained subcharacter components." Proceedings of the 2017 Conference on Empirical Methods in Natural Language Processing (Year: 2017).
International Preliminary Report on Patentability Chapter I for PCT Application No. PCT/CN2018/101053 dated May 7, 2020.
International Preliminary Report on Patentability Chapter I for PCT Application No. PCT/CN2018/105959 dated May 28, 2020.
Search Report for European Application No. 18870742.6 dated Sep. 3, 2020.
Shihao Ji et aL, "Parallelizing Word2Vec in Shared and Distributed Memory", Aug. 8, 2016.
lubair Sahil et al., "Learning Word Embeddings in Parallel by Alignment", 2017 International Conference on High Performance Computing & Simulation, Jul. 17, 2017.
Feng Niu et al., "Hogwild!: A Lock-Free Approach to Parallelizing Stochastic Gradient Descent", Cornell University Library, Jun. 28, 2011.
Saurabh Gupta et aL, "BlazingText: Scaling and Accelerating Word2Vec using Multiple GPUs", Proceedings of the Machine Learning on HPC Environments, Nov. 12, 2017.

* cited by examiner

METHOD, DEVICE, AND APPARATUS FOR WORD VECTOR PROCESSING BASED ON CLUSTERS

CROSS REFERENCE TO RELATED APPLICATIONS

This application is a continuation application of International Application No. PCT/CN2018/105959, filed on Sep. 17, 2018, which claims priority to and benefits of Chinese Patent Application No. 201711123278.8 filed on Nov. 14, 2017. The contents of the above-referenced applications are incorporated herein by reference in their entirety.

TECHNICAL FIELD

The present application relates to the field of computer software technologies, and in particular, to a cluster-based word vector processing method, apparatus, and device.

BACKGROUND

Most of today's natural language processing solutions use neural network-based architectures. An important underlying technology in such an architecture is word vectors. A word vector maps a word to a fixed dimension, and the vector represents semantic information of the word.

In the existing technologies, common algorithms for generating word vectors, such as Google's word vector algorithm and Microsoft's deep neural network algorithm, often run on a single computer.

Based on the existing technologies, an efficient large-scale word vector training solutions is needed.

SUMMARY

Embodiments of the present application provide a cluster-based word vector processing method, apparatus, and device, to resolve the following technical problem: an efficient large-scale word vector training solution is needed.

To resolve the foregoing technical problem, the embodiments of the present application are implemented as follows:

An embodiment of the present application provides a cluster-based word vector processing method to be performed by a cluster including a plurality of worker computers and a server. The method includes operations performed by each of the worker computers: obtaining a word and at least one context word of the word that are extracted from a corpus; obtaining word vectors for the word and the at least one context word; calculating a gradient according to the word, the at least one context word, and the word vectors; and asynchronously updating the gradient by sending, without waiting for another worker computer to send a gradient to the server, the updated gradient to the server to enable theserver to update the word vectors for the word and the at least one context word according to the updated gradient.

An embodiment of the present application provides a cluster-based word vector processing apparatus at a cluster, where the cluster includes a plurality of worker computers and a server, and the apparatus includes a first obtaining module, a second obtaining module, a gradient calculation module, and an asynchronous update module that are located in each of the worker computers, and a word vector updating module located in the server. Each worker computer separately performs the following steps by using the corresponding modules. The first obtaining module is configured to obtain a word and at least one context word of the word that are extracted from a corpus. The second obtaining module is configured to obtain word vectors for the word and the at least one context word of the word. The gradient calculation module is configured to calculate a gradient according to the word, the at least one context word of the word, and the word vectors. The asynchronous update module is configured to asynchronously update the gradient to the server. The word vector updating module of the server updates the word vectors for the word and the at least one context word of the word according to the gradient.

An embodiment of the present application provides a cluster-based word vector processing device. The device belongs to a cluster, and includes at least one processor and a memory in communication connection with the at least one processor. The memory stores instructions executable by the at least one processor to enable the at least one processor to: obtain a word and at least one context word of the word that are extracted from a corpus; obtain word vectors for the word and the at least one context word; calculate a gradient according to the word, the at least one context word, and the word vectors; asynchronously update the gradient; and update the word vectors for the word and the at least one context word according to the asynchronously updated gradient.

An embodiment of the present application provides a cluster comprising a server and a worker-computer cluster including a plurality of worker computers. Each of the worker computers includes at least one processor and a memory and is configured to perform operations including: obtaining a word and at least one context word of the word that are extracted from a corpus; obtaining word vectors for the word and the at least one context word; calculating a gradient according to the word, the at least one context word, and the word vectors; asynchronously updating the gradient by sending, without waiting for another worker computer to send a gradient to the server, the updated gradient to the server to enable the server to update the word vectors for the word and the at least one context word according to the updated gradient.

An embodiment of the present application provides a non-transitory computer-readable storage medium storing instructions executable by one or more processors to cause the one or more processors to perform, at a cluster comprising a server and a worker computer cluster including a plurality of worker computers, operations at each of worker computers including obtaining a word and at least one context word of the word that are extracted from a corpus; obtaining word vectors for the word and the at least one context word; calculating a gradient according to the word, the at least one context word, and the word vectors; asynchronously updating the gradient by sending, without waiting for another worker computer to send a gradient to the server, the updated gradient to the server to enable the server to update the word vectors for the word and the at least one context word according to the updated gradient.

The foregoing at least one technical solution used in the embodiments of the present application can achieve the following beneficial effect: During training, the worker computers do not need to wait for each other, but asynchronously update/upload, to the server, a gradient calculated for each word, and then the server updates a word vector of each word according to the gradient. Therefore, a word vector training and convergence speed can be improved. In addition, a distributed processing capability of the cluster enables the solution to be applicable to large-scale word vector training with a relatively high efficiency.

BRIEF DESCRIPTION OF THE DRAWINGS

To describe the technical solutions in the embodiments of this specification or in the prior art more clearly, the following briefly introduces the accompanying drawings required for describing the embodiments or the prior art. Apparently, the accompanying drawings in the following description show merely some embodiments of this specification, and a person of ordinary skill in the art may still derive other drawings from these accompanying drawings without creative efforts.

DETAILED DESCRIPTION OF THE INVENTION

Embodiments of the present application provide a cluster-based word vector processing method, apparatus, and device.

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this application. All other embodiments obtained by a person of ordinary skill in the art based on the embodiments of this specification without creative efforts shall fall within the protection scope of this application.

The solutions in the present application are applicable to a cluster, and efficiency in processing large-scale word vectors in the cluster is higher. Specifically, training corpuses may be divided, and then a plurality of worker computers in the cluster separately trains word vectors in a distributed manner corresponding to one or more corpuses obtained through division according to the one or more corpuses in coordination with one or more servers. During training, each worker computer is responsible for calculating a gradient corresponding to each word, and asynchronously updates the gradient to the server, and the server is responsible for updating the word vectors according to the gradient.

Figure 1:
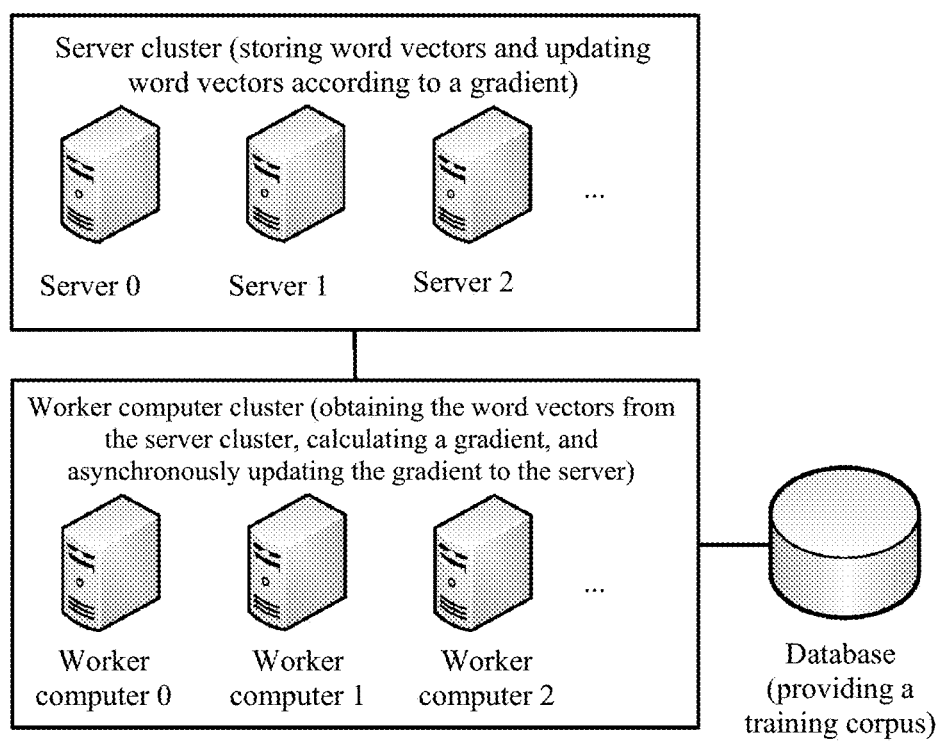
FIG. 1 is a schematic diagram of an overall architecture of a cluster, according an embodiment of the present application.

The solutions may involve one or more clusters, and for example, in FIG. 1, the solutions involve two clusters.

FIG. 1 is a schematic diagram of an overall architecture of a cluster involved in an actual application scenario, according to a solution of the present application. The overall architecture includes three parts: a server cluster including a plurality of servers, a worker computer cluster including a plurality of worker computers, and a database.

The database stores corpuses used for training, for the worker computer cluster to read. The server cluster stores original word vectors, and the worker computer cluster cooperates with the server cluster to train word vectors by asynchronously updating a gradient.

The architecture in FIG. 1 is a non-limiting example. For example, the solution may alternatively involve only one cluster. The cluster includes at least one scheduler and a plurality of worker computers, and the scheduler completes the work of the foregoing server cluster. As another example, the solution may alternatively or additionally involve one worker computer cluster and one server, and so on.

The following describes the solutions of the present application in detail based on the architecture in FIG. 1.

Figure 2:
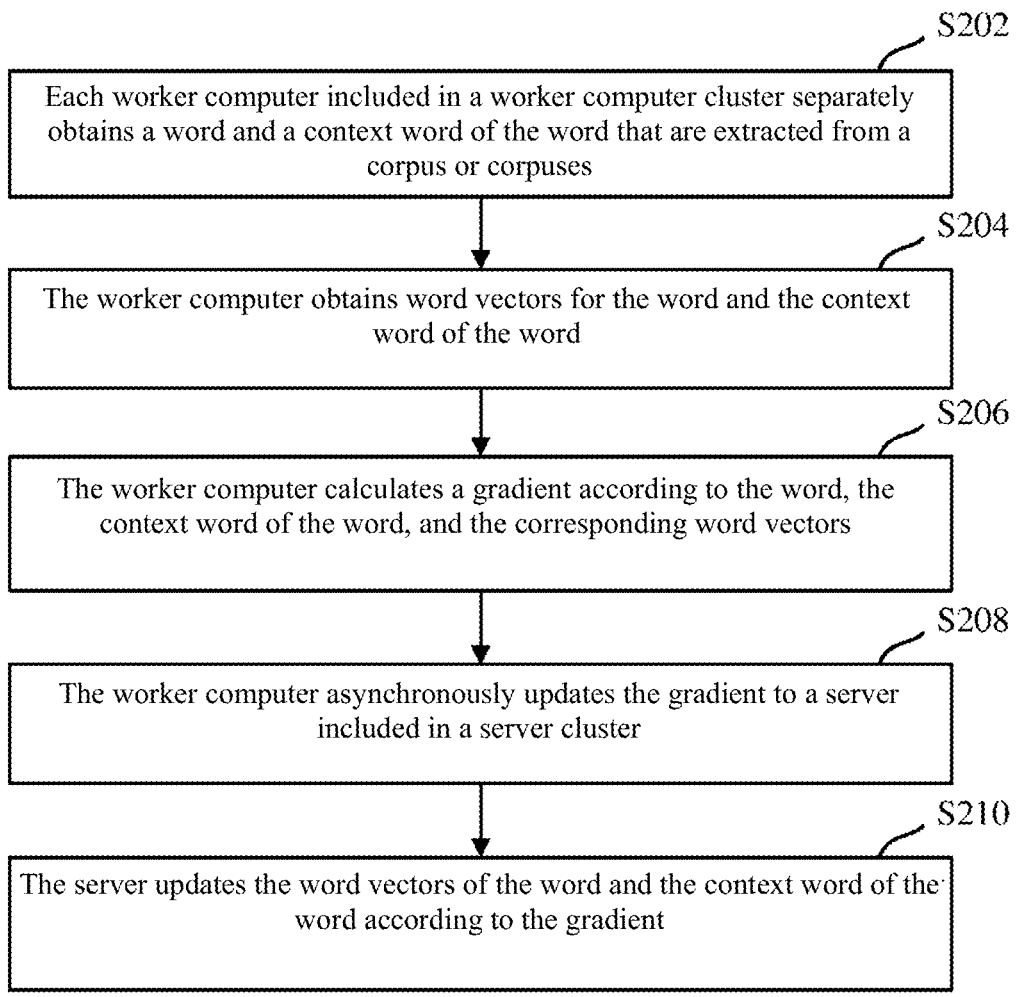
FIG. 2 is a flowchart of a cluster-based word vector processing method, according to an embodiment of the present application.

Referring now to FIG. 2, FIG. 2 is a flowchart of a cluster-based word vector processing method, according to an embodiment of the present application. A cluster includes a worker computer cluster and a server cluster. Some operations in FIG. 2 are performed by at least one computer (or a program on a computer) in the cluster, and different operations may be performed by different execution entities. The procedure in FIG. 2 may be performed a plurality of rounds, a different group of corpuses may be used in each round, and the corpuses are used for training word vectors.

The procedure in FIG. 2 includes the following operations:

In S202, each worker computer included in the worker computer cluster separately obtains a word and at least one context word of the word that are extracted from one or more corpuses.

In S204, the worker computer obtains word vectors for the word and the one or more context word of the word.

In S206, the worker computer calculates a gradient according to the word, the one or more context word of the word, and the corresponding word vectors.

In S208, the worker computer asynchronously updates the gradient to a server included in the server cluster.

In S210, the server updates the word vectors for the word and the one or more context word of the word according to the gradient.

In the present embodiment of the present application, each worker computer may perform operations S202 to S208. Each worker computer usually corresponds to different corpuses. In this case, large-scale training corpuses can be efficiently used, and word vector training efficiency can also be improved. For example, corpuses or a corpus currently used for training word vectors may be divided into a plurality of parts, each worker computer may read one part, and then perform operations S202 to S208 based on the part of the corpuses or corpus read by the worker computer.

For explanation, operations S202 to S208 are described mainly from a perspective of a particular worker computer in the following embodiments.

In an embodiment of the present application, if a current round of operations is the first round of operations, the word vectors obtained in step S204 may be obtained through initialization. For example, a word vector of each word and a word vector of a context word of the word may be initialized randomly or according to a specified probability distribution. The specified probability distribution may be, for example, a distribution between 0 and 1. If the current round of operations is not the first round of operations, the word vectors obtained in step S204 may be word vectors that are updated and stored after a previous round of operations is performed.

In an embodiment of the present application, a process of training a word vectors mainly includes: calculating a gradient and updating the vector according to the gradient, which are respectively performed by the worker computer cluster and the server cluster. During training, after the worker computer completes calculation, results need to be synchronized to the server, and there are usually two modes: synchronous updating and asynchronous updating. Synchronous updating means that each worker computer performs model averaging in a particular manner and then performs updating to the server (generally, different averaging policies cause different results, and a model averaging policy design is an important part of synchronous updating). The asynchronous update means that any worker computer updates/sends data to the server immediately after calculation completed, without waiting for another worker computer, and without performing model averaging. In terms of a final effect, in the asynchronous updating, because one worker computer does not need to wait for other worker computers to complete calculation, a training convergence speed is usually higher. The solutions of the present application are described mainly based on the manner of asynchronous updating. Specifically, asynchronously updated data includes a gradient that corresponds to each word and that is calculated by the worker computer.

In the present embodiment of the present application, operation S210 is performed by the server cluster, and the updated word vectors are also stored in the server cluster, for use in a next round of operations. Certainly, in an architecture other than that in FIG. 1, operation S210 may be alternatively performed by a scheduler or a server that belongs to a same cluster as the worker computer.

The rest can be deduced by analogy. After a plurality of rounds of operations is performed until all groups of training corpuses are used, the server cluster may write final word vectors obtained through updating into a database, for use in various scenarios that require the word vectors.

Based on the method in FIG. 2, during training, the worker computers do not need to wait for each other, but asynchronously update, to the server, a gradient calculated for each word, and then the server updates a word vector of each word according to the gradient. Therefore, a word vector training and convergence speed can be improved. In addition, a distributed processing capability of the cluster enables the solution to be applicable to large-scale word vector training and efficiency is relatively high.

Based on the method in FIG. 2, an embodiment of the present application further provides some specific implementation solutions of the method and expanded solutions. The following description are provided based on the architecture in FIG. 1.

In this embodiment of the present application, extracting a word and at least one context word of the word may be performed by the worker computer, or may be performed in advance by another device. For example, in the former manner, before operation S202 of obtaining a word and at least one context word of the word that are extracted from one or more corpuses, the following may further be performed: obtaining, by each of the worker computers, a portion of the one or more corpuses through distributed reading. If the one or more corpuses are stored in the database, the one or more corpuses may be read from the database.

In the present embodiment, the obtaining a word and at least one context word of the word that are extracted from one or more corpuses may specifically include: creating word pairs according to the portion of the one or more corpuses obtained through reading, where each of the word pairs includes a current word and a context word of the current word. For example, a word in the portion of the one or more corpuses obtained through reading may be scanned. A currently-scanned word is the current word and denoted as w. A sliding window including w is determined according to a specified sliding window distance. Each of the other word or words in the sliding window is used as a context word of w and denoted as c. In this way, a word pair $\{w, c\}$ is formed.

Further, it is assumed that word vectors are stored in a plurality of servers included in the server cluster. In this case, operation S204 of obtaining word vectors for the word and the at least one context word of the word may specifically include: obtaining a current word set and a context word set through extraction according to the created word pairs; and obtaining word vectors for words included in the current word set and the context word set from the server. Certainly, this is non-limiting implementation. For example, a word vector of a currently-scanned word may be obtained from the server when the corpus is scanned, and the created word pair may not need to be used.

In an embodiment of the present application, a gradient corresponding to each word included in the current word set and the context word set may be calculated according to a designated loss function, each created word pair, and the word vectors for the words included in the current word set and the context word set.

To obtain a better training effect and achieve faster convergence, a designated negative sample word may be introduced as a comparative calculation gradient of the context word. A negative sample word has a lower correlation with the corresponding current word than the context word, and generally, several negative sample words may be randomly selected from all words. In such a case, operation S206 of calculating a gradient according to the word, the at least one context word of the word, and the word vectors may specifically include: calculating a gradient corresponding to each word included in the current word set and the context word set according to a designated loss function, a designated negative sample word, each created word pair, and the word vectors for the words included in the current word set and the context word set.

A current word and each negative sample word of the current word may also constitute a word pair (which is referred to as a negative sample word pair), where c' is used to represent the negative sample word, and the negative sample word pair is denoted as $\{w, c'\}$. Assuming that there are $\lambda$ negative sample words, corresponding $\lambda$ negative sample word pairs may be denoted as $\{w, c'_1\}$, $\{w, c'_2\}$, . . . , and $\{w, c'_\lambda\}$. For ease of description, the negative sample word pair and the foregoing context word pair (a word pair formed by the current word and the context word of the current word) are collectively denoted as $\{w, c\}$. A variable y is used for distinguishing these two types of word pairs. For the context word pair, y=1, and for the negative sample word pair, y=0.

In the present embodiment, the foregoing loss function may have different forms, and usually include at least two items, where one item reflects a similarity between a current word and a context word of the current word, and the other item reflects a similarity between the current word and a negative sample word of the current word. Vector point multiplication may be used to measure the similarity, or another manner may be used to measure the similarity. For example, in an actual application scenario, a gradient ∇ corresponding to the current word is calculated by using the following formula:

$$\nabla = \sigma(\vec{w} \cdot \vec{c}) - y \quad \text{(formula 1)}$$

where $\vec{w}$ represents a word vector of w, $\vec{c}$ represents a word vector of c, σ is an activation function, and σ is a sigmoid function, where $$\sigma = \frac{1}{1+e^{-x}}.$$

Further, one or more threads on each worker computer may calculate the gradient in a manner of asynchronous calculation and unlocked updating. Therefore, the one or more threads on the worker computer may also calculate gradients in parallel without interfering with each other, thereby further improving calculation efficiency.

In an embodiment of the present application, operation S208 of asynchronously updating, by the worker computer, the gradient to the server may specifically include: sending, by the worker computer without waiting for another worker computer to send a gradient to the server, the gradient to the server after obtaining the gradient through calculation.

In the present embodiment, after obtaining the gradient asynchronously updated by the worker computer, the server may update the corresponding word vector of the current word by using the gradient. In addition, the server may further update the context word of the current word and the word vector of the negative sample word by using the gradient. A specific update manner may be performed with reference to a gradient descent method.

For example, operation S210 of updating, by the server, the word vectors for the word and the at least one context word of the word according to the gradient may specifically include: iteratively updating the word, the at least one context word of the word, and a word vector of the negative sample word according to the following formula:

$$\vec{w}_{t+1}=\vec{w}_t-\alpha \cdot \nabla \cdot \vec{c}_p\, w \in B_k \quad \text{(formula 2) and}$$

$$\vec{c}_{t+1}=\vec{c}_t-\alpha \cdot \nabla \cdot \vec{w}_p\, c \in \Gamma(w) \quad \text{(formula 3),}$$

where $$\nabla = \sigma(\vec{w}\cdot\vec{c})-y,\; y=\begin{cases}1, \{w,c\}\\ 0, \{w,c'\}\end{cases},$$

w represents a current word, c represents a context word of w', c' represents a negative sample word, $\vec{w}$ represents a word vector of w, $\vec{c}$ represents a word vector of c, $\vec{w}_t$ and $\vec{c}_t$ represent a $t^{th}$ update on the server, $B_k$ represents a $k^{th}$ corpus on the worker computer, Γ(w) represents a set of a context word and a negative sample word of w, α represents a learning rate, and σ is, for example, a sigmoid function.

Figure 3:
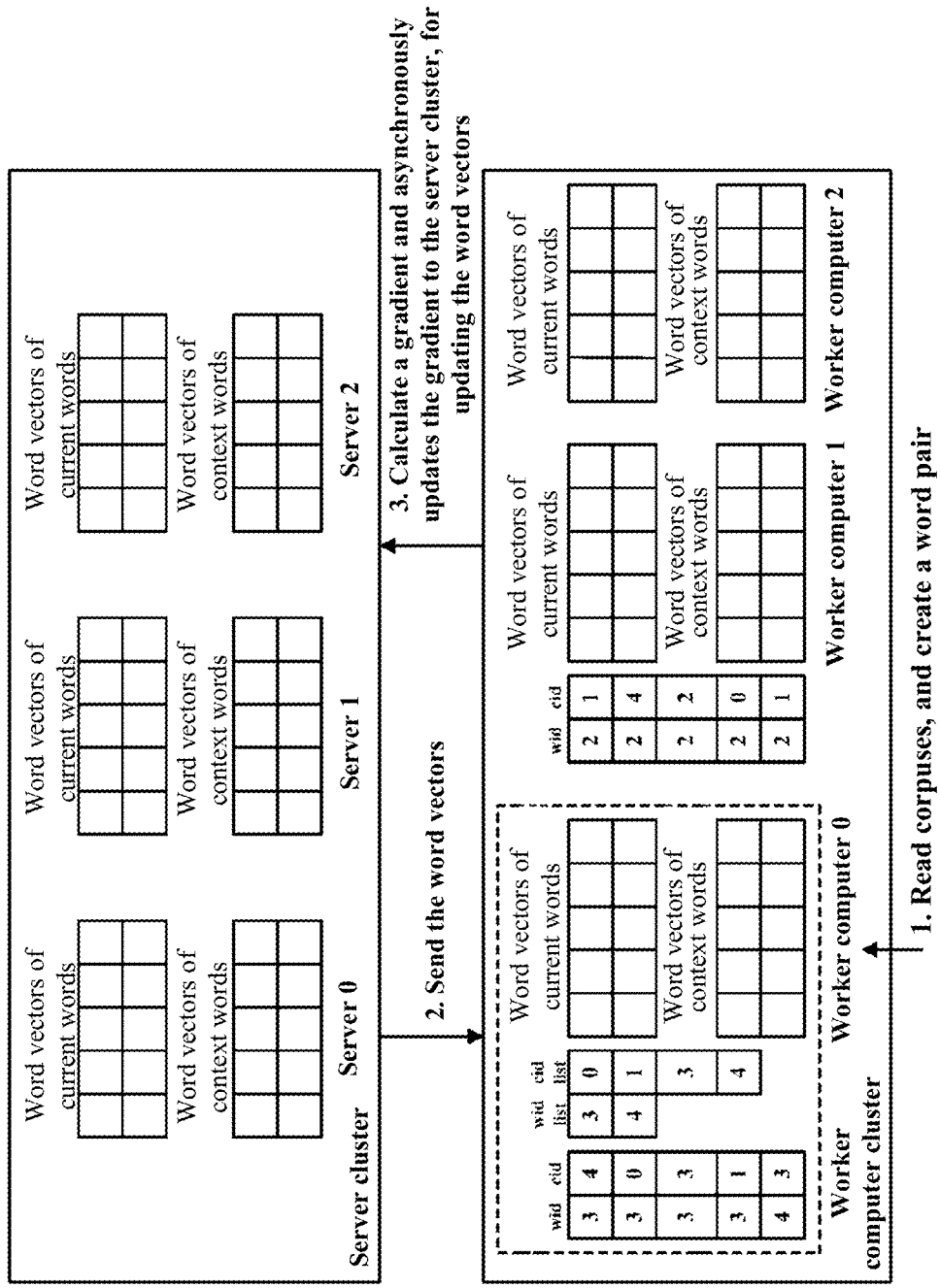
FIG. 3 is a schematic diagram of a cluster-based word vector processing method, according to an embodiment of the present application.

According to the foregoing description, an embodiment of the present application further provides a cluster-based word vector processing method in an actual application scenario, as shown in FIG. 3. Further, FIG. 4 is a flowchart of a cluster-based word vector processing method corresponding to FIG. 3.

FIG. 3 shows worker computers 0 to 2 and servers 0 to 2. Description provided for the worker computer 0 may also be applied to worker computers 1 and 2. Work modes of the worker computers 1 and 2 are consistent with a work mode of the worker computer 0. "wid" and "cid" are identifiers and respectively represent the current words and the context words. "wid list" and "cid list" are lists of identifiers and respectively represent the current word set and the context word set. A brief work operations in FIG. 3 includes: each worker computer reads one or more corpuses or a portion thereof in a distributed manner, and creates one or more word pairs. Each worker computer obtains corresponding word vectors from the server cluster. Each worker computer calculates a gradient using the read one or more corpuses or a portion thereof and asynchronously updates the gradient to the server cluster. The server cluster updates the word vectors according to the gradient.

Figure 4:
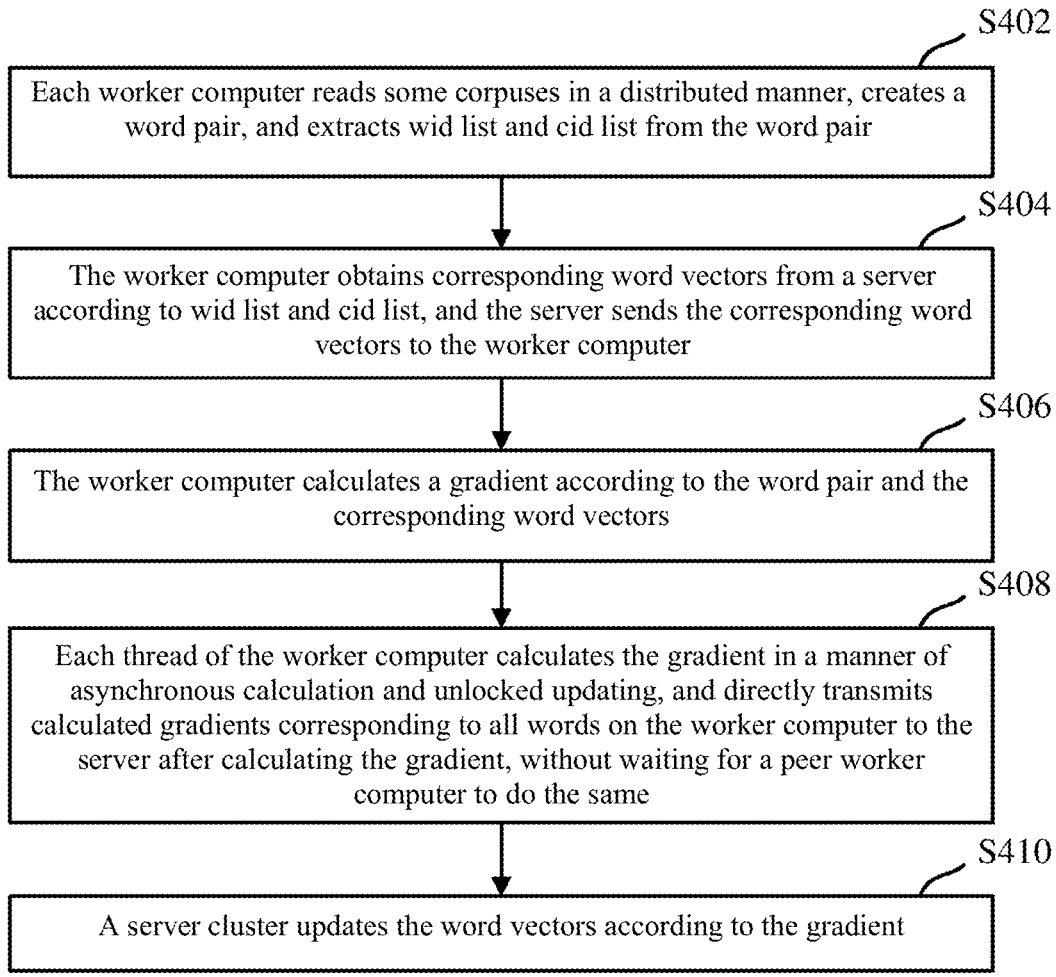
FIG. 4 is a flowchart of a cluster-based word vector processing method corresponding to FIG. 3, according to an embodiment of the present application.

FIG. 4 shows a more detailed operations, including the following operations.

In S402, each worker computer reads one or more corpuses or a portion thereof in a distributed manner, creates a word pair {w, c}, and extracts wid list and cid list from the word pair, as shown at the worker computer 0 in FIG. 3.

In S404, the worker computer obtains corresponding word vectors from a server according to wid list and cid list, and the server sends the corresponding word vectors to the worker computer.

In S406, the worker computer calculates a gradient according to the word pair and the corresponding word vectors using the foregoing formula 1.

In S408, each thread of the worker computer calculates the gradient in a manner of asynchronous calculation and unlocked updating, and directly transmits calculated gradients corresponding to all words calculated at the worker computer to the server, without waiting for other worker computers to do the same.

In S410, a server cluster updates the word vectors according to the gradient using the foregoing formula 2 and formula 3.

Figure 5:
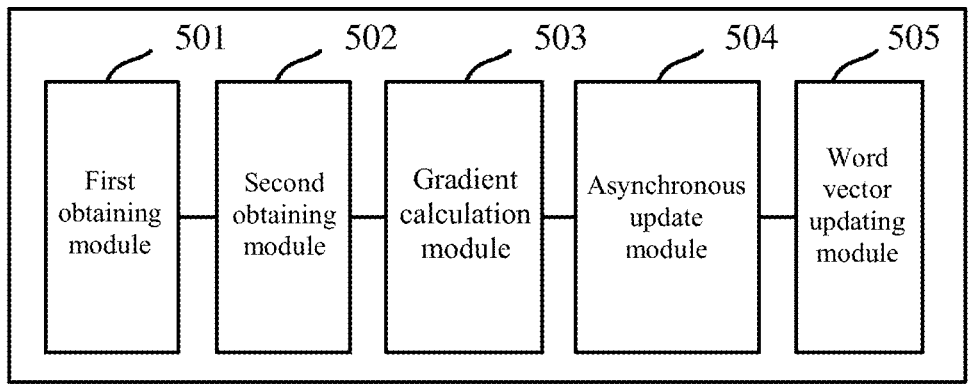
FIG. 5 is a schematic structural diagram of a cluster-based word vector processing apparatus corresponding to FIG. 2, according to an embodiment of the present application.

Based on a same idea, an embodiment of the present application further provides an apparatus, as shown in FIG. 5, corresponding to the foregoing method.

FIG. 5 is a schematic structural diagram of a cluster-based word vector processing apparatus corresponding to FIG. 2, according to an embodiment of the present application. The cluster includes a plurality of worker computers and a server. The apparatus is located in a cluster and includes a first obtaining module 501, a second obtaining module 502, a gradient calculation module 503, and an asynchronous update module 504 that are located in the worker computer, and a word vector updating module 505 located in the server.

Each worker computer separately performs the following operations using the corresponding modules.

The first obtaining module 501 is configured to obtain a word and at least one context word of the word that are extracted from one or more corpuses.

The second obtaining module 502 is configured to obtain word vectors for the word and the at least one context word of the word.

The gradient calculation module 503 is configured to calculate a gradient according to the word, the at least one context word of the word, and the corresponding word vectors.

The asynchronous update module 504 is configured to asynchronously update the gradient to the server.

The word vector updating module 505 of the server updates the word vectors for the word and the at least one context word of the word according to the gradient.

In some embodiments, the first obtaining module 501 obtains the one or more corpuses through distributed reading before obtaining the word and the context word of the word that are extracted from the one or more corpuses. The first obtaining module 501 obtains the word and the at least one context word of the word that are extracted from the one or more corpuses includes: creating, by the first obtaining module 501, word pairs according to the one or more corpuses obtained by the first obtaining module through reading, where each of the word pairs includes a current word and a context word of the current word.

In some embodiments, the second obtaining module 502 obtains the word vectors for the word and the at least one context word of the word by: obtaining, by the second obtaining module 502, a current word set and a context word set through extraction according to each of the word pairs created by the first obtaining module 501; and obtaining word vectors for words included in the current word set and the context word set from the server.

In some embodiments, the gradient calculation module 503 calculates the gradient according to the word, the at least one context word of the word, and the corresponding word vectors by: calculating, by the gradient calculation module 503, a gradient for each word included in the current word set and the context word set according to a designated loss function, a designated negative sample word, each created word pair, and the word vectors for the words included in the current word set and the context word set.

In some embodiments, the gradient calculation module 503 calculates the gradient by: calculating, by one or more threads of the gradient calculation module 503, the gradient in a manner of asynchronous calculation and unlocked updating.

In some embodiments, the asynchronous update module 504 asynchronously updates the gradient to the server by: sending, by the asynchronous update module 504, the gradient to the server after the gradient calculation module 503 obtains the gradient through calculation, where the sending of the gradient does not need to wait for an asynchronous update module 504 of another worker computer to send a gradient to the server.

In some embodiments, the word vector updating module 505 updates the word vectors for the word and the at least one context word of the word according to the gradient by: iteratively updating, by the word vector updating module 505, the word, the at least one context word of the word, and a word vector of the negative sample word according to the following formula:

$$\vec{w}_{t+1} = \vec{w}_t - \alpha \cdot \nabla \cdot \vec{c}_p, w \in B_k \text{ and}$$

$$\vec{c}_{t+1} = \vec{c}_t - \alpha \cdot \nabla \cdot \vec{w}_p, c \in \Gamma(w),$$

where $$\nabla = \sigma(\vec{w} \cdot \vec{c}) - y, \quad y = \begin{cases} 1, & \{w, c\} \\ 0, & \{w, c'\} \end{cases},$$

w represents a current word, c represents a context word of w, c' represents a negative sample word, $\vec{w}$ represents a word vector of w, $\vec{c}$ represents a word vector of c, $\vec{w}_t$ and $\vec{c}_t$ represent a $t^{th}$ update on the server, $B_k$ represents a $k^{th}$ corpus on the worker computer, $\Gamma(w)$ represents a set of a context word and a negative sample word of w, α represents a learning rate, and σ is a sigmoid function.

Based on a same idea, an embodiment of the present application further provides a cluster-based word vector processing device corresponding to FIG. 2. The device belongs to the cluster and includes at least one processor and a memory in communication connection with the at least one processor. The memory stores an instruction executable by the at least one processor to enable the at least one processor to: obtain a word and at least one context word of the word that are extracted from one or more corpuses; obtain word vectors for the word and the at least one context word of the word; calculate a gradient according to the word, the at least one context word of the word, and the word vectors; asynchronously update the gradient; and update the word vectors for the word and the at least one context word of the word according to the asynchronously updated gradient.

Based on a same idea, an embodiment of the present application further provides a non-transitory computer storage medium corresponding to FIG. 2. The non-transitory computer storage medium stores computer executable instructions which, when executed by one or more processors, cause the one or more processor to perform operations including: obtaining a word and at least one context word of the word that are extracted from one or more corpuses; obtaining word vectors for the word and the at least one context word of the word; calculating a gradient according to the word, the at least one context word of the word, and the word vectors; and asynchronously updating the gradient; and updating the word vectors for the word and the at least one context word of the word according to the asynchronously updated gradient.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The embodiments of this specification are all described in a progressive manner, for same or similar parts in the embodiments, refer to these embodiments, and descriptions of each embodiment focus on a difference from other embodiments. Especially, an apparatus embodiment, a device embodiment, or a non-transitory computer storage medium embodiment is basically similar to a method embodiment, and therefore is described briefly; for related parts, refer to partial descriptions in the method embodiment.

The apparatus, the device, and the non-transitory computer storage medium provided in the embodiments of this specification correspond to the method, so that the apparatus, the device, and the non-volatile computer storage medium also have beneficial technical effects similar to those of the corresponding method. Since the beneficial technical effects of the method have been described in detail above, the beneficial technical effects of the corresponding apparatus, device, and non-transitory computer storage medium are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this specification, the function of the units may be implemented in a same piece of or multiple pieces of software and/or hardware.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

This specification is described with reference to the flowchart and/or block diagram of the method, device (system), and computer program product of the embodiments of this specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

This specification can be described in the general context of computer-executable instructions executed by a computer, for example, a program module. Generally, the program module includes a routine, a program, an object, a component, a data structure, and the like for executing a particular task or implementing a particular abstract data type. This specification may also be practiced in distributed computing environments in which tasks are performed by remote processing devices that are connected by using a communications network. In a distributed computing environment, the program module may be located in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this specification and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A cluster-based word vector processing method to be performed at a cluster comprising a plurality of worker computers and a server, the method comprising operations performed by each of the worker computers:
obtaining a word and at least one context word of the word that are extracted from a corpus;
obtaining word vectors for the word and the at least one context word;
calculating a gradient according to the word, the at least one context word, and the word vectors; and
asynchronously updating the gradient by sending, without waiting for a peer worker computer to send a gradient to the server, the updated gradient to the server to enable the server to update the word vectors for the word and the at least one context word according to the updated gradient, wherein the server updates the word vectors for the word and the at least one context word, by:
iteratively updating the word vectors for the word and the at least one context word, and a word vector of a negative sample word of the word according to the following formula:

$$\vec{w}_{t+1} = \vec{w}_t - \alpha \cdot \nabla \cdot \vec{c}_t, w \in B_k \text{ and}$$

$$\vec{c}_{t+1} = \vec{c}_t - \alpha \cdot \nabla \cdot \vec{w}_t, c \in \Gamma(w),$$

wherein $$\nabla = \sigma(\vec{w} \cdot \vec{c}) - y, y = \begin{cases} 1, \{w, c\} \\ 0, \{w, c'\} \end{cases}$$

w represents the word, c represents a context word of the at least one context word of w, c' represents the negative sample word, $\vec{w}$ represents the word vector of w, $\vec{c}$ represents the word vector of c, $\vec{w}_t$ and $\vec{c}_t$ represent a $t^{th}$ update on the server, $B_k$ represents a $k^{th}$ corpus on the worker computer, $\Gamma(w)$ represents a set of the context word and the negative sample word of w, α represents a learning rate, and σ is a sigmoid function.

2. The method according to claim 1, wherein before the obtaining the word and the at least one context word of the word that are extracted from the corpus, the method further comprises:
obtaining, by each of the worker computers, a respective portion of the corpus through distributed reading; and
wherein the obtaining the word and the at least one context word of the word that are extracted from the corpus comprises:
creating word pairs according to the respective portion of the corpus, wherein each of the word pairs comprises a current word and a context word of the current word.

3. The method according to claim 2, wherein the obtaining word vectors for the word and the at least one context word comprises:
obtaining a current word set and a context word set through extraction according to the word pairs; and
obtaining word vectors for words included in the current word set and the context word set from the server.

4. The method according to claim 1, wherein the calculating the gradient according to the word, the at least one context word, and the word vectors comprises:
calculating, by one or more threads on the worker computer, the gradient in a manner of asynchronous calculation and unlocked updating.

5. The method according to claim 1, wherein the asynchronously updating the gradient comprises:
sending, by the worker computer, the updated gradient to the server without performing model averaging.

6. A cluster comprising a server and a worker-computer cluster including a plurality of worker computers, wherein:
each of the worker computers includes at least one processor and a memory and is configured to perform operations by the at least one processor, the operations including:
obtaining a word and at least one context word of the word that are extracted from a corpus;
obtaining word vectors for the word and the at least one context word;

calculating a gradient according to the word, the at least one context word, and the word vectors;

asynchronously updating the gradient by sending, without waiting for a peer worker computer to send a gradient to the server, the updated gradient to the server to enable the server to update the word vectors for the word and the at least one context word according to the updated gradient, wherein the server updates the word vectors for the word and the at least one context word, by:

iteratively updating the word vectors for the word and the at least one context word, and a word vector of a negative sample word of the word according to the following formula:

$$\vec{w}_{t+1}=\vec{w}_t-\alpha\cdot\nabla\cdot\vec{c}_t, w\in B_k \text{ and}$$

$$\vec{c}_{t+1}=\vec{c}_t-\alpha\cdot\nabla\cdot\vec{w}_t, c\in\Gamma(w),$$

wherein $$\nabla = \sigma(\vec{w}\cdot\vec{c}) - y, y = \begin{cases} 1, \{w, c\} \\ 0, \{w, c'\} \end{cases}$$

w represents the word, c represents a context word of the at least one context word of w, c' represents the negative sample word, $\vec{w}$ represents the word vector of w, $\vec{c}$ represents the word vector of c, $\vec{w}_t$ and $\vec{c}_t$ represent a $t^{th}$ update on the server, $B_k$ represents a $k^{th}$ corpus on the worker computer, $\Gamma(w)$ represents a set of the context word and the negative sample word of w, $\alpha$ represents a learning rate, and $\sigma$ is a sigmoid function.

7. The cluster according to claim 6, wherein before the obtaining the word and the at least one context word of the word that are extracted from the corpus, each of the worker computers is configured to perform:

obtaining, by each of the worker computers, a respective portion of the corpus through distributed reading; and wherein the obtaining the word and the at least one context word of the word that are extracted from the corpus comprises:

creating word pairs according to the respective portion of the corpus, wherein each of the word pairs comprises a current word and a context word of the current word.

8. The cluster according to claim 7, wherein the obtaining word vectors for the word and the at least one context word comprises:

obtaining a current word set and a context word set through extraction according to the word pairs; and obtaining word vectors for words included in the current word set and the context word set from the server.

9. The cluster according to claim 6, wherein the calculating the gradient according to the word, the at least one context word, and the word vectors comprises:

calculating, by one or more threads on the worker computer, the gradient in a manner of asynchronous calculation and unlocked updating.

10. The cluster according to claim 6, wherein the asynchronously updating the gradient comprises:

sending, by the worker computer, the updated gradient to the server without performing model averaging.

11. A non-transitory computer-readable storage medium storing instructions executable by one or more processors to cause the one or more processors to perform at a cluster comprising a server and a worker computer cluster including a plurality of worker computers:

operations at each of the worker computers:

obtaining a word and at least one context word of the word that are extracted from a corpus;

obtaining word vectors for the word and the at least one context word;

calculating a gradient according to the word, the at least one context word, and the word vectors;

asynchronously updating the gradient by sending, without waiting for a peer worker computer to send a gradient to the server, the updated gradient to the server to enable the server to update the word vectors for the word and the at least one context word according to the updated gradient, wherein the server updates the word vectors for the word and the at least one context word, by:

iteratively updating the word vectors for the word and the at least one context word, and a word vector of a negative sample word of the word according to the following formula:

$$\vec{w}_{t+1}=\vec{w}_t-\alpha\cdot\nabla\cdot\vec{c}_t, w\in B_k \text{ and}$$

$$\vec{c}_{t+1}=\vec{c}_t-\alpha\cdot\nabla\cdot\vec{w}_t, c\in\Gamma(w),$$

wherein $$\nabla = \sigma(\vec{w}\cdot\vec{c}) - y, y = \begin{cases} 1, \{w, c\} \\ 0, \{w, c'\} \end{cases}$$

w represents the word, c represents a context word of the at least one context word of w, c' represents the negative sample word, $\vec{w}$ represents the word vector of w, $\vec{c}$ represents the word vector of c, $\vec{w}_t$ and $\vec{c}_t$ represent a $t^{th}$ update on the server, $B_k$ represents a $k^{th}$ corpus on the worker computer, $\Gamma(w)$ represents a set of the context word and the negative sample word of w, $\alpha$ represents a learning rate, and $\sigma$ is a sigmoid function.

12. The non-transitory computer-readable storage medium according to claim 11, wherein before the obtaining the word and the at least one context word of the word that are extracted from the corpus, the operations at each of worker computers further comprise:

obtaining, by each of the worker computers, a respective portion of the corpus through distributed reading; and wherein the obtaining the word and the at least one context word of the word that are extracted from the corpus comprises:

creating word pairs according to the respective portion of the corpus, wherein each of the word pairs comprises a current word and a context word of the current word.

13. The non-transitory computer-readable storage medium according to claim 12, wherein the obtaining word vectors for the word and the at least one context word comprises:

obtaining a current word set and a context word set through extraction according to the word pairs; and obtaining word vectors for words included in the current word set and the context word set from the server.

14. The non-transitory computer-readable storage medium according to claim 11, wherein the calculating a gradient according to the word, the at least one context word, and the word vectors comprises:

calculating, by one or more threads on the worker computer, the gradient in a manner of asynchronous calculation and unlocked updating.

15. The non-transitory computer-readable storage medium according to claim 11, wherein the asynchronously updating the gradient comprises:
sending, by the worker computer, the updated gradient to the server without performing model averaging.

* * * * *